United States Patent
Takagi

(10) Patent No.: US 8,342,309 B2
(45) Date of Patent: Jan. 1, 2013

(54) BLIND OPERATING DEVICE

(75) Inventor: Koji Takagi, Chuo-ku (JP)

(73) Assignee: Nichibei Co., Ltd., Tokyo (JP)

( * ) Notice: Subject to any disclaimer, the term of this patent is extended or adjusted under 35 U.S.C. 154(b) by 652 days.

(21) Appl. No.: 12/528,721

(22) PCT Filed: Jan. 22, 2008

(86) PCT No.: PCT/JP2008/050791
§ 371 (c)(1),
(2), (4) Date: Aug. 26, 2009

(87) PCT Pub. No.: WO2008/108114
PCT Pub. Date: Sep. 12, 2008

(65) Prior Publication Data
US 2010/0037717 A1  Feb. 18, 2010

(30) Foreign Application Priority Data
Mar. 2, 2007  (JP) .................................. 2007-052925

(51) Int. Cl.
*E06B 9/322* (2006.01)
(52) U.S. Cl. ..................................... 192/223.4; 160/298
(58) Field of Classification Search ............... 192/223.4; 188/77 W; 160/298
See application file for complete search history.

(56) References Cited

U.S. PATENT DOCUMENTS

| 4,372,432 A * | 2/1983 | Waine et al. ............... 192/223.4 |
| 7,080,719 B2 * | 7/2006 | Arnold et al. ............... 188/77 W |

FOREIGN PATENT DOCUMENTS

| JP | 63-44996 | 3/1988 |
| JP | 01-192983 | 8/1989 |
| JP | 04-073392 | 3/1992 |
| JP | 4-22713 | 5/1992 |
| JP | 6-78595 | 11/1994 |
| JP | 07-331969 | 12/1995 |
| JP | 11-117645 | 4/1999 |
| JP | 11-256959 | 9/1999 |
| JP | 2002-115729 | 4/2002 |
| JP | 2003-184908 | 3/2003 |

\* cited by examiner

*Primary Examiner* — Rodney Bonck
(74) *Attorney, Agent, or Firm* — Miller, Matthias & Hull LLP

(57) ABSTRACT

There is provided a blind operating device for transmitting a rotation in both directions from an operation portion to a driving axis of the blind capable of making a diameter of a clutch spring smaller, and then capable of reducing operation load without breaking the clutch spring. The blind operating device includes an input shaft into which a rotation from a pulley is inputted, and a rotation axis that is provided coaxially with the input axis and is capable of transmitting the rotation to the driving axis. A clutch spring is wound around a fixed spring winding axis of a case and a rotation spring winding axis of the rotation axis. Linking and de-linking of the rotation axis and the case is made possible utilizing tightening and loosening of the clutch spring and one end of the clutch spring is linked to the rotation axis. When the rotation in one direction is inputted to the input axis, a part of the clutch spring wound around the fixed spring winding axis loosens starting from a rotation spring winding axis side, whereby the rotation axis is allowed to rotate with the input axis.

7 Claims, 5 Drawing Sheets

Fig. 5
Fig. 5A
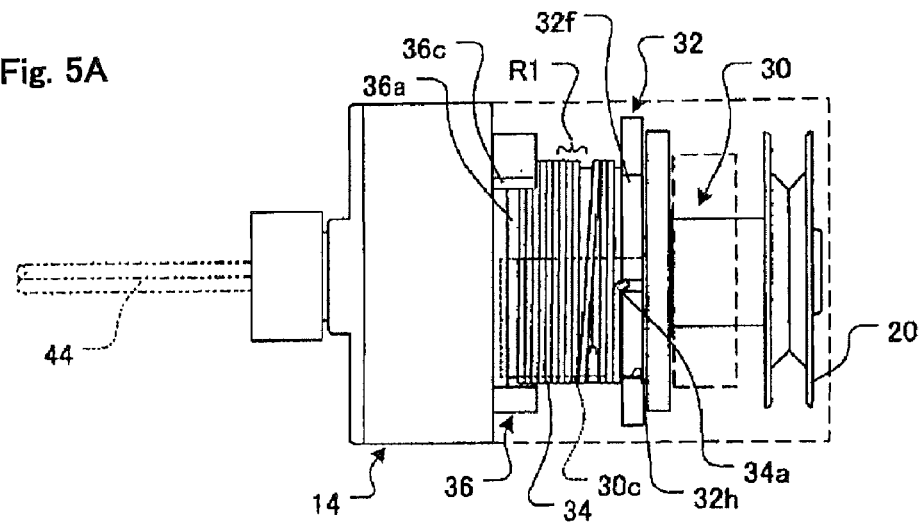
Fig. 5B
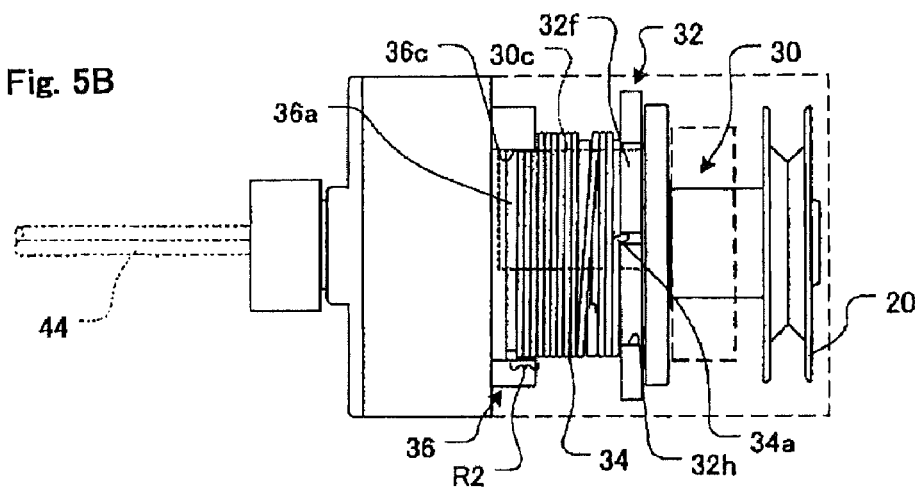
Fig. 5C
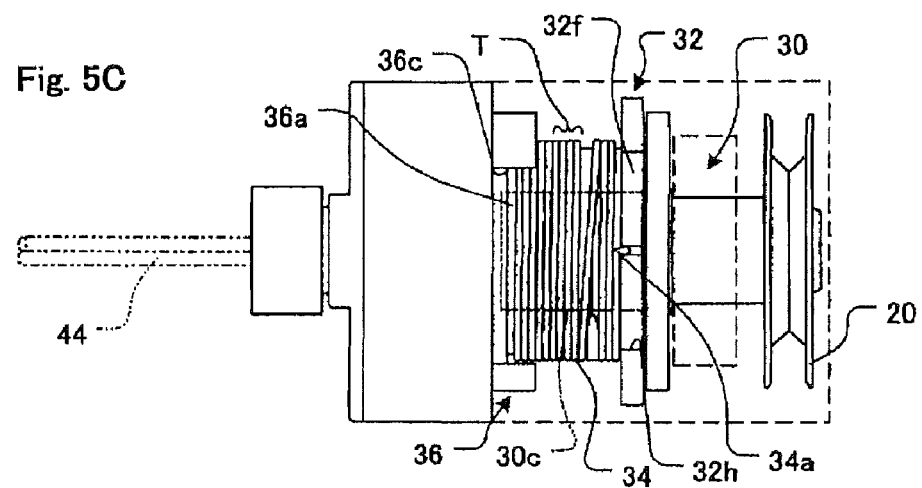

Fig. 6
Fig. 6A
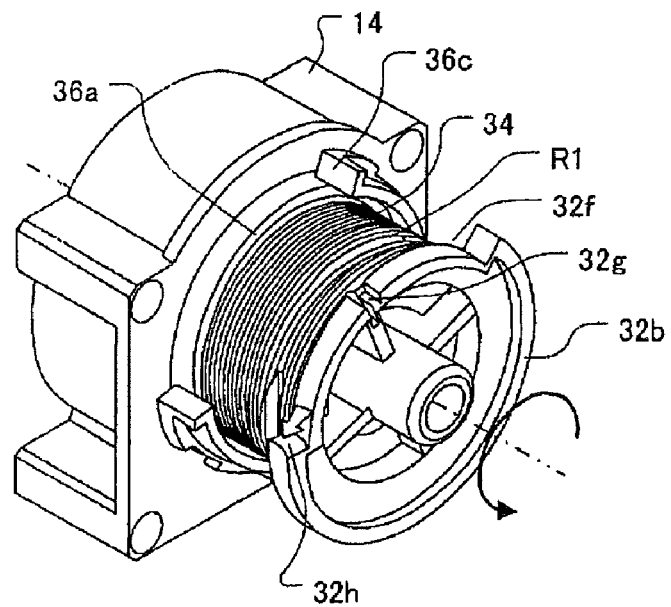
Fig. 6B
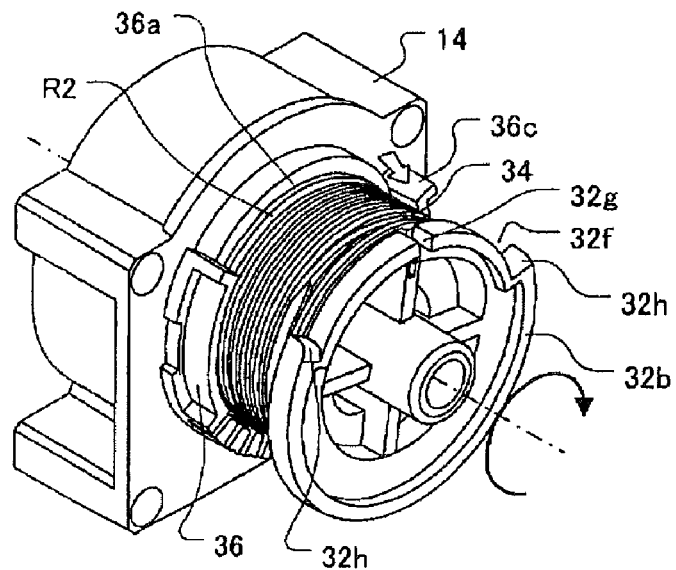

BLIND OPERATING DEVICE

CROSS-REFERENCE TO RELATED APPLICATIONS

This application is a U.S. national stage filing of International Patent Application No. PCT/JP2008/050791 filed on Jan. 22, 2008, which claims priority under the Paris Convention to Japanese Patent Application No. 2007-052925, filed on Mar. 2, 2007.

FIELD OF THE DISCLOSURE

Background Art of the Disclosure

Conventionally, as a blind operating device of this type, one described in Japanese Utility Model Application Publication (JP-Y) No. 4-22713 is known. In the blind operating device described in JP-Y No. 4-22713, a rotation axis is divided into a driven axis and a driving axis for rotating the driven axis, a driving axis body provided with a circular arch protrusion is fixed to an end portion of the driving axis and the driving axis body is rotatably received in an axis hole of a fixed brake drum. A coil spring is fitted on an outer peripheral surface of the brake drum while both end portions of the coil spring extend in radial directions. A driven axis body provided with a split sleeve is fixed to the driven axis, the circular arch protrusion of the driving axis is inserted into a slit of the split sleeve of the driven axis body so as to leave gaps on both sides of the circular arch protrusion, and the both end portions of the coil spring are inserted in the gaps.

When the driving axis is rotated, the circular arc protrusion presses either one of the both end portions of the coil spring in a direction causing the coil spring to expand, and thus, the coil spring rotates together with the driving axis so as to rotate the split sleeve, whereby a rotation is transmitted to the driven axis. On the other hand, when slat are affected by wind or the like and ready to rotate the driven axis, the slit sleeve presses one of the both end portions of the coil spring in a direction causing the coil spring to contract, and thus, the inner peripheral surface of the coil spring is tightly contacted to the outer periphery surface of the brake drum, whereby a rotation of the split sleeve and then of the driven axis can be blocked.

SUMMARY OF THE DISCLOSURE

However, the operating device described in the Japanese Utility Model Application Publication No. 4-22713 is configured in such a manner that when the split sleeve presses one of both end portions of the coil spring, the coil spring contracts and tightly contacts the fixed brake drum. Therefore, there is a problem that the operating device has a risk that the end portion of the coil spring may be broken if the driven axis rotates to cause the split sleeve to strongly push the end portion of the coil spring with even for a moment or if weight of the blind is large.

It is considered that such problem of the coil spring breakage can be avoided by making a diameter of the coil wire larger, however, this requires a force for expanding a coil spring having a large diameter coil wire to rotate the driving axis in order to operate the blind, resulting in a problem of increasing operation load.

The present invention is made in view of the problem and the object thereof is to provide a blind operating device capable of making a diameter of a clutch spring small, and then capable of reducing operation load without breaking the clutch spring.

To accomplish the above object, a blind operating device for respectively transmitting a rotation in both directions from an operation portion to a driving axis of the blind, according to a first aspect of the present invention includes:

an input axis into which the rotation from the operation portion is inputted;

a rotation axis that is provided coaxially with the input axis and is capable of transmitting the rotation to the driving axis; and a fixed body, wherein the rotation axis includes a rotation spring winding axis and the fixed body includes a fixed spring winding axis which is aligned with the rotation spring winding axis, a clutch spring is wound around the fixed spring winding axis and the rotation spring winding axis for allowing switching of linking and de-linking of the rotation axis and the fixed body by utilizing tightening and loosening of the clutch spring, one end of the clutch spring is linked to the rotation axis, when the rotation in one direction is inputted to the input axis, the input axis presses the rotation axis and presses the one end of the clutch spring so that the clutch spring loosens whereby the rotation axis is allowed to rotate with the input axis, and when the rotation in the other direction is inputted to the input axis, the input axis presses the other end of the clutch spring so that the clutch spring loosens, whereby the rotation axis is allowed to rotate with the input axis.

A blind operating device for respectively transmitting a rotation in both directions from an operation portion to a driving axis of the blind, according to a second aspect of the present invention includes:

an input axis into which the rotation from the operation portion is inputted;

a rotation axis that is provided coaxially with the input axis and is capable of transmitting the rotation to the driving axis; and a fixed body, wherein the rotation axis includes a rotation spring winding axis and the fixed body includes a fixed spring winding axis which is aligned with the rotation spring winding axis, a clutch spring is wound around the fixed spring winding axis and the rotation spring winding axis for allowing switching of linking and de-linking of the rotation axis and the fixed body by utilizing tightening and loosening of the clutch spring, when the rotation in one direction is inputted to the input axis, a part of the clutch spring wound around the fixed spring winding axis loosens starting from a rotation spring winding axis side, whereby the rotation axis is allowed to rotate with the input axis, and when the rotation in the other direction is inputted to the input axis, a part of the clutch spring wound around the fixed spring winding axis loosens starting from an opposite side to the rotation spring winding axis, whereby the rotation axis is allowed to rotate with the input axis. In this case, it is preferable that when the rotation in the one direction is inputted to the input axis, the rotation is firstly transmitted to a part of the clutch spring wound around the rotation spring winding axis.

It is preferable that the blind operating device further includes a clutch spring receiver which is provided rotatably on a peripheral surface of the fixed spring winding axis and to which the other end of the clutch axis is linked, wherein when the rotation in the other direction is inputted to the input axis, the input axis presses the clutch spring receiver so that the clutch spring loosens. Since the input axis does not directly presses the other end of the clutch spring, stress concentration on the clutch spring can be avoided.

A blind operating device for transmitting a rotation in both directions from an operation portion to a driving axis of the blind, according to a third aspect of the present invention includes: an input axis into which the rotation from the operation portion is inputted;

a rotation axis that is provided coaxially with the input axis and is capable of transmitting the rotation to the driving axis; and a fixed body, wherein the rotation axis includes a rotation spring winding axis and the fixed body includes a fixed spring winding axis which is aligned with the rotation spring winding axis, a clutch spring is wound around the fixed spring winding axis and the rotation spring winding axis for allowing switching of linking and de-linking of the rotation axis and the fixed body by utilizing tightening and loosening of the clutch spring, and when a rotation is transmitted from the driving axis to the rotation axis, a part of the clutch spring wound around the fixed spring winding axis tightens the fixed spring winding axis starting from the rotation spring winding axis side, whereby a rotation of the rotation axis can be blocked.

The clutch spring is wound around over the fixed spring winding axis and the rotation spring winding axis. Accordingly, when a force, particularly a force for the clutch spring to tighten, is inputted to the clutch spring, the clutch spring can tighten starting from a middle portion in a portion wound around the fixed spring winding axis, whereby stress concentration on one end of the clutch spring can be avoided. In this manner, the blind operating device can be configured unlikely to cause a breakage of the clutch spring. Therefore, a diameter of the clutch spring wire can be made small. And making the clutch spring wire have a small diameter, operation load can be reduced.

In addition, when the clutch spring loosens, the clutch spring can loosen starting from a middle portion in a portion wound around the fixed spring winding axis.

BRIEF DESCRIPTION OF DRAWINGS

FIG. 5A is a plan view of the blind operating device upon lifting a shielding member without illustrating a part of the blind operating device, in which a pressing member is shown with a broken line to help illustration.

FIG. 5B is a plan view of the blind operating device upon lowering the shielding member without illustrating a part of the blind operating device, in which the pressing member is shown with a broken line to help illustration.

FIG. 5C is a plan view of the blind operating device when the shielding member is stopped without illustrating a part of the blind operating device, in which the pressing member is shown with a broken line to help illustration.

FIG. 6A is a perspective view of the blind operating device upon lifting the shielding member without illustrating a part of the blind operating device, in which an input axis is not shown to help illustration.

FIG. 6B is a perspective view of the blind operating device upon lowering the shielding member without illustrating a part of the blind operating device, in which the input axis is not shown to help illustration.

REFERENCE SIGNS LIST

Figure 1:
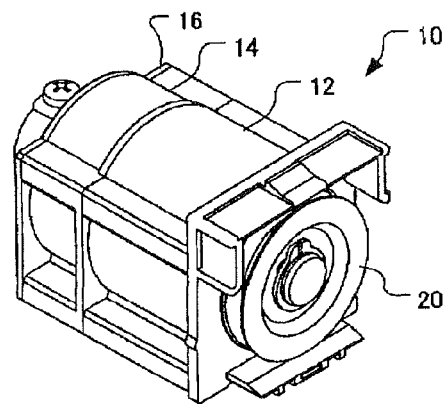
FIG. 1 is a perspective view of a blind operating device of a first embodiment of the present invention.

10: Blind operating device
14: Second case (fixed body)
14b: Fixed spring winding axis
20: Pulley (Operation portion)
22: Operation Cord (Operation portion)
30: Input axis
32: Rotation axis
32C: Rotation spring winding axis
34: Clutch spring
34a: One end of clutch spring
34b: The other end of clutch spring
44: Driving axis

DESCRIPTION OF EMBODIMENTS

Figure 2:
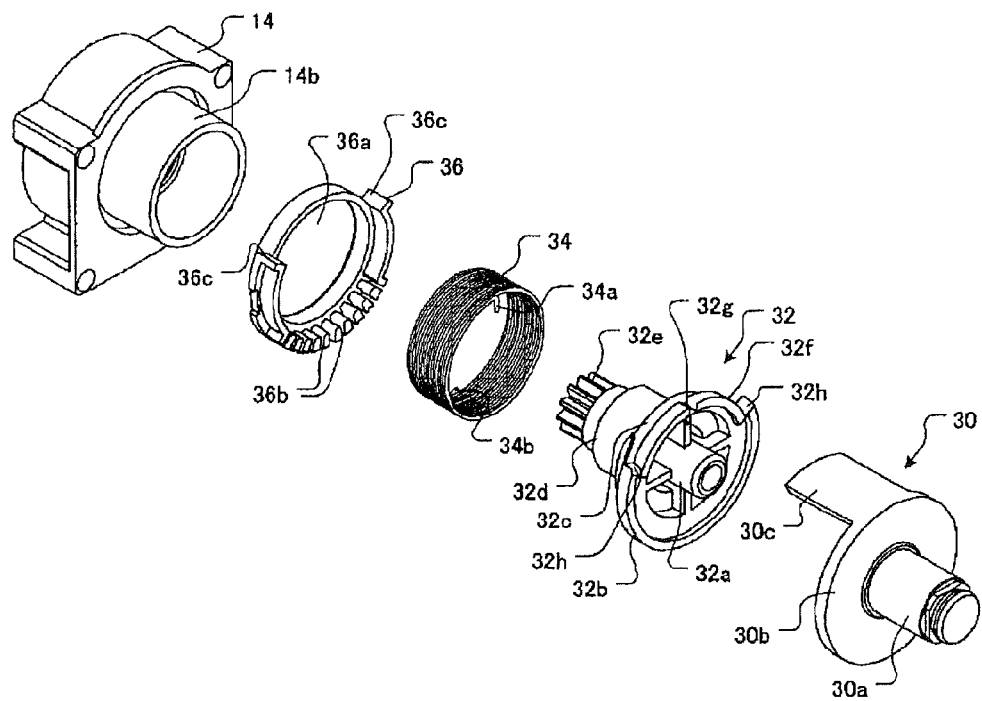
FIG. 2 is an exploded perspective view of a substantial part of the blind operating device of FIG. 1.
Figure 3:
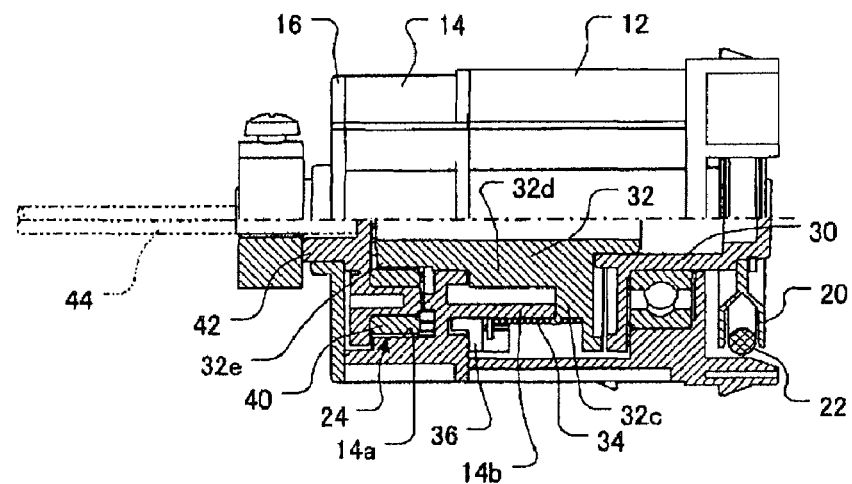
FIG. 3 is a partial sectional view of the blind operating device of FIG. 1.
Figure 4:
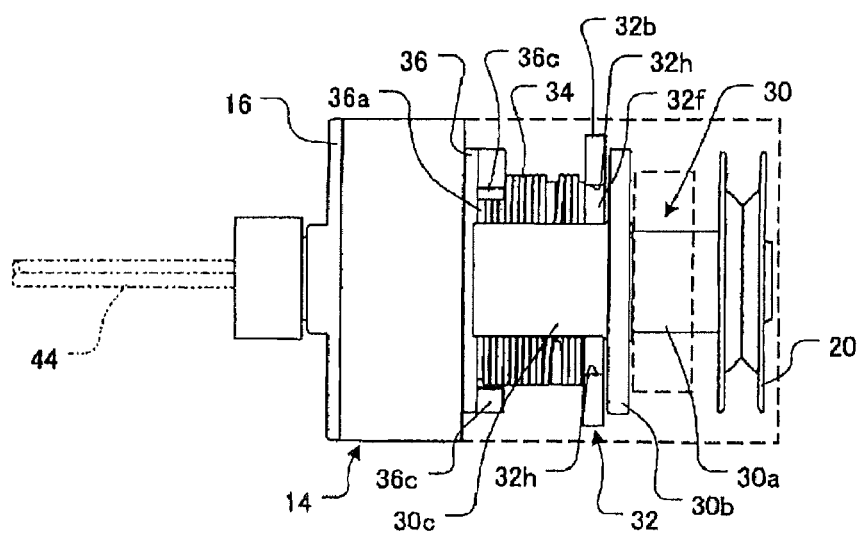
FIG. 4 is a plan view of the blind operating device of FIG. 1 without illustrating a part thereof.

An embodiment of the present invention is described referring to the drawings. FIG. 1 is a perspective view of a blind operating device of an embodiment of the present invention, FIG. 2 is an exploded perspective view of a substantial part thereof, FIG. 3 is a partial sectional view thereof, and FIG. 4 is a plan view thereof without illustrating a part thereof.

Figure 7:
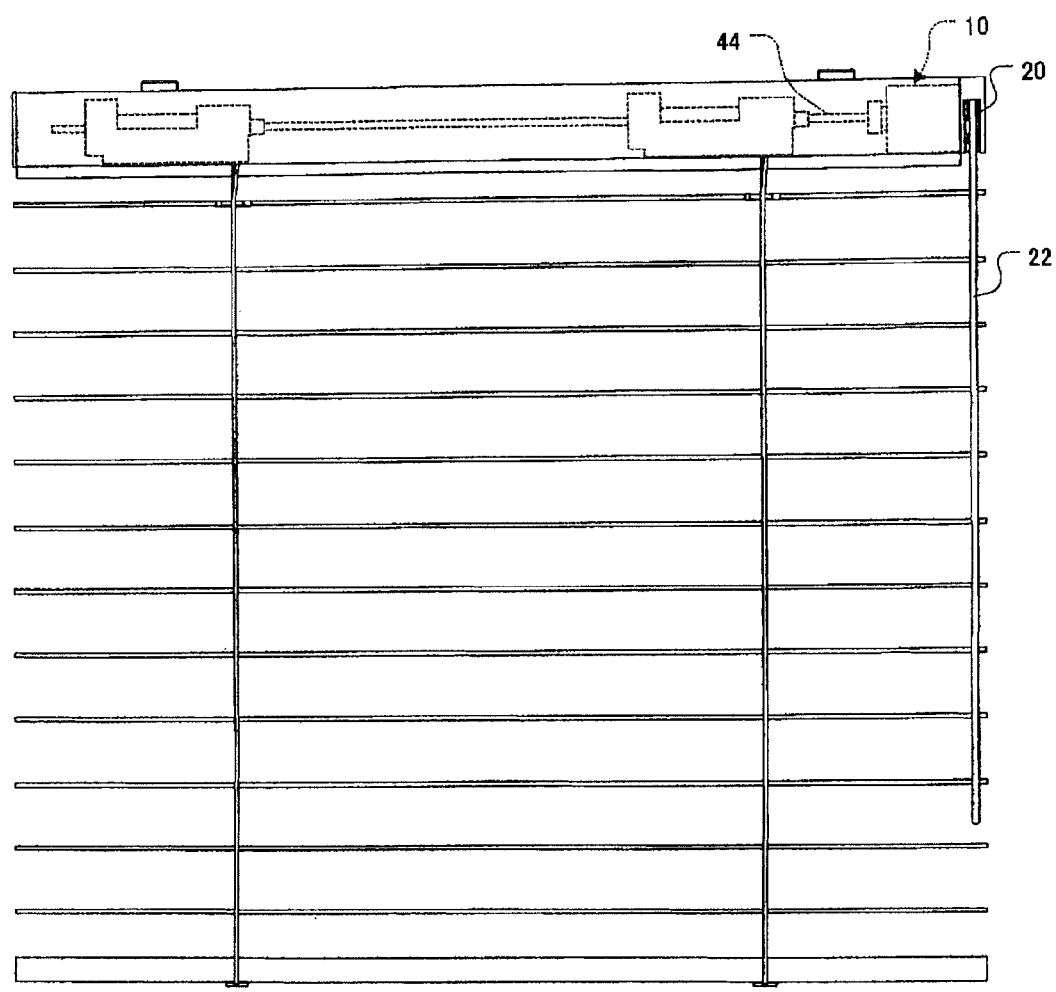
FIG. 7 is an elevation view of a blind to which the blind operating device of FIG. 1 is adopted.

The operating device can be applied to arbitrary kinds of blind. In this example, the operating device is applied to a Venetian blind as shown in FIG. 7. However, its applicable scope is not limited thereto and the operating device can be applied to arbitrary blind, in which arbitral shielding member is lifted/lowered or is opened/closed, such as a pleated screen, a roman shade, a roll screen.

In an operating device 10 shown in the figures, a fixed outer housing is configured by assembling together a first case 12 on input side, a second case (fixed body) 14 on output side, and a cover 16 for closing an open end of the second case 14. The operating device 10 is integrally assembled together with an operation portion that is manually operated. More specifically, the operation portion includes a pulley 20 and an operation cord 22 wound around the pulley 20. In addition, the operating device 10 incorporates a planetary gear mechanism 24 in the second case 14 as a reduction gear provided on output side; however the operating device 10 does not necessarily incorporate such a planetary gear mechanism and the planetary gear mechanism 24 can be eliminated.

The operating device 10 further includes an input axis 30, a rotation axis 32 that is provided coaxially with and in parallel to the input axis 30, a clutch spring 34, and a spring receiver 36. These components are described hereinafter.

The input axis 30 or shaft is received in the first case 12 and includes a central axis portion 30a for supporting the pulley 20 without allowing a relative rotation between them, a flange portion 30b having a larger diameter than that of the central axis portion 30a, and a pressing member 30c extending from an outer peripheral portion of a part of the flange portion 30b toward the output side in an axis direction. Thus, the input axis 30 is configured in such a manner that a rotation of the pulley 20 is transmitted to the input axis 30.

The rotation axis 32 includes a smaller diameter portion 32a inserted in the central axis portion 30a of the input axis 30, a spring receiving portion 32b having a larger diameter than that of the smaller diameter portion 32a, a rotation spring winding axis 32c which is provided on the output side of the spring receiving portion 32b and around which a part of the clutch spring 34 is wound, and an output axis portion 32d that has a smaller diameter than that of the rotation spring winding axis 32c and is received in the second case 14.

A cutout portion 32f is formed on outer peripheral portion of the spring receiving portion 32b and the pressing member 30c of the input axis 30 passes through the cutout portion 32f. Then, pressing portions 32h, 32h, to which the pressing member 30c can abut, are formed on both sides of the cutout portion 32f of the spring receiving portion 32b. In addition, a locking groove 32g for locking one end 34a of the clutch spring 34 is formed in a central part of the cutout portion 32f of the spring receiving portion 32b.

A sun gear 32e of the planetary gear mechanism 24 is formed on an output side tip end of the output axis portion 32d. As shown in FIG. 3, the planetary gear mechanism 24 includes the sun gear 32e, a planetary gear 40 meshing with the sun gear 32e, internal teeth 14a formed on internal peripheral surface of the second case 14, and an output axis 42 for supporting the planetary gear 40. The output axis 42 is coupled with a driving axis 44 that moves in conjunction with the movement of the shielding member. That is to say, the rotation axis 32 is linked with the output axis 42 and the driving axis 44 via the planetary gear mechanism 24.

A cylindrical fixed spring winding axis 14b is formed in the second case 14. The fixed spring winding axis 14b having the same outer diameter with the rotation spring winding axis 32c is provided in parallel to the rotation spring winding axis 32c. The clutch spring 34 is wound around the rotation spring winding axis 32c and the fixed spring winding axis 14b. In a boundary part of the rotation spring winding axis 32c and the fixed spring winding axis 14b, a rib and a cutout portion formed thereon, which are disclosed in Japanese Patent Application Laid-Open (JP-A) No. 2002-115729, are preferably formed on at least one of the rotation spring winding axis 32c and the fixed spring winding axis 14b, whereby the clutch spring 34 can be prevented from falling into a boundary portion and biting into the axes.

The spring receiver 36 is rotatably fitted on the outer peripheral surface of the fixed spring winding axis 14b of the second case 14 on the opposite side of the rotation spring winding axis 32c. A cutout 36a is formed on the spring receiver 36 and the pressing member 30c of the input axis 30 passes through the cutout portion 36a. Then, pressing portions 36c, 36c, to which the pressing member 30c can abut, are formed on both sides of the cutout portion 36a of the spring receiver 36. In addition, a plurality of locking grooves 36b are formed around the spring receiver 36 and one of the locking grooves 36b is selected to lock the other end 34b of the clutch spring 34.

The positions in the circumferential direction of the cutout portion 32f of the spring receiving portion 32b and the cutout portion 36a of the spring receiver 36 do not exactly match and are shifted from each other as shown in FIG. 4.

The operation of the blind operating device 10 configured as described above is described hereinafter.

In order to lift the shielding member of the blind, the operation cord 22 is operated and a rotation in a lifting direction is inputted to the input axis 30 via the pulley 20. Accordingly, as shown in FIGS. 5A and 6A, pressing member 30c (shown with a broken line in FIG. 5) of the input axis 30 moves in the cutout portion 32f of the spring receiving portion 32b of the rotation axis 32 and in the cutout portion 36a of the spring receiver 36 so as to firstly abut the pressing portion 32h of the cutout portion 32f of the rotation axis 32 thereby pressing the rotation axis 32. When the rotation axis 32 rotates in the lifting direction through this operation, the one end 34a of the clutch spring 34 is pressed so that the clutch spring 34 loosens and is allowed to rotate. Then, the rotation axis 32 is allowed to rotate with the clutch spring 34 and the driving axis 44 rotates in the lifting direction, whereby the shielding member is lifted.

On the other hand, in order to lower the shielding member, the operation cord 22 is operated and a rotation in a lowering direction is inputted to the input axis 30 via the pulley 20. Accordingly, as shown in FIGS. 5B and 6B, pressing member 30c of the input axis 30 moves in the cutout portion 32f of the spring receiving portion 32b of the rotation axis 32 and in the cutout portion 36a of the spring receiver 36 so as to firstly abut the pressing portion 36c of the cutout portion 36a of the spring receiver 36, thereby pressing the pressing portion 36c. When the spring receiver 36 rotates in the lowering direction through this operation, the other end 34b of the clutch spring 34 is pressed so that the clutch spring 34 loosens and is allowed to rotate. Then, the rotation axis 32 is allowed to rotate with the clutch spring 34 and then the driving axis 44 rotates in the lowering direction, whereby the shielding member is lowered.

Next, in a state where the operation cord 22 is not operated, the rotation in the lowering direction due to own weight of the shielding member is transmitted from the driving axis 44. This rotation is transmitted to the rotation axis 32 to make the spring receiving portion 32b ready to rotate in the lowering direction, and thus the one end 34a of the clutch spring 34 is pressed in a direction opposite to that shown in FIG. 5A. However, because the clutch spring 34 tightens the fixed spring winding axis 14b, which is fixed, the clutch spring 34 is not allowed to rotate, and thus a rotation of the rotation axis 32 can be blocked. Therefore, the shielding member can remain in a stopped state (FIG. 5C).

The operations of the clutch spring 34 as described above, more specifically, loosening of the clutch spring 34 upon lifting the shielding member and tightening of the clutch spring 34 when the shielding member is in the stopped state do not occur in vicinity of the one end 34a of the conventional clutch spring 34 but occur from the peripheral surface of the fixed spring winding axis 14b in the vicinity of the boundary part of the rotation spring winding axis 32c and the fixed spring winding axis 14b, which is on middle position away from the one end 34a as indicated by R1 and T in the FIGS. 5 and 6. The reason is described below. The force transmitted to the clutch spring 34 is inputted from the one end 34a and transmitted from a part of the clutch spring 34 wound around the rotation spring winding axis 32c to a part of the clutch spring 34 wound around the fixed spring winding axis 14b. At this time, the rotation spring winding axis 32c is ready to move with the part of the clutch spring 34 wound around the rotation spring winding axis 32c, and thus the rotation spring winding axis 32c and the part of the clutch spring 34 wound around the rotation spring winding axis 32c are integrated so as to generate no force therebetween. Instead, loosening and tightening occur on the fixed spring winding axis 14b, which is fixed, starting from the rotation spring winding axis 32c side of the fixed spring winding axis 14b. As described above, the vicinity of the one end 34a of the clutch spring 34 operates integrally with the rotation spring winding axis 32c. Therefore, stress concentration on the one end 34a of the clutch spring 34 upon tightening, which is one reason of breakage of the conventional clutch spring, can be avoided. Consequently, a configuration, in which the clutch spring 34 is unlikely to be broken, can be realized, and thus, it is possible to make the clutch spring 34 having a smaller diameter wire and accordingly possible to decrease operation load that is required when operating the clutch spring 34.

In addition, the loosening of the clutch spring 34 occurs starting from the vicinity R2 of the other end 34b of the clutch spring 34 upon lowering the shielding member. That is to say, the loosening occurs on the fixed spring winding axis 14b, which is fixed, starting from an opposite side to the rotation spring winding axis 32c side of the fixed spring winding axis 14b. At this time, the input axis 30 does not directly press the other end 34b but directly presses the spring receiver 36, whereby stress concentration of the clutch spring 34 can be prevented. However, it should be noted that a force for the clutch spring 34 to be tightened is not inputted to the other end 34b of the clutch spring 34 on the fixed spring winding axis 14b and only a force for the clutch spring 34 to be loosened is inputted so that stress concentration in the vicinity of the other end 34b is not large enough to break the clutch spring 34. Therefore, spring receiver 36 may be arbitrarily eliminated and the other end 34b of the clutch spring 34 may be bent on the fixed spring winding axis 14b so that the input axis 30 may directly press the other end 34b.

The invention claimed is:

1. A blind operating device for respectively transmitting a rotation in both directions from an operation portion to a driving shaft of the blind comprising:
   an input shaft into which rotation from the operation portion is adapted to be inputted;
   a rotation shaft that is arranged coaxially with the input shaft and is capable of transmitting rotation to the driving shaft, said rotation shaft including a rotation spring winding shaft;
   a fixed body, said fixed body including a fixed spring winding shaft which is aligned with the rotation spring winding shaft;
   a clutch spring that is wound around the fixed spring winding shaft of the fixed body and the rotation spring winding shaft of the rotation shaft for allowing switching of linking and de-linking of the rotation shaft and the fixed body by utilizing tightening and loosening of the clutch spring, one end of the clutch spring being connected to the rotation shaft; and
   a clutch spring receiver which is arranged rotatably around a peripheral surface of the fixed spring winding shaft of the fixed body and to which the other end of the clutch spring is connected;
   wherein
   when rotation in one direction is inputted to the input shaft, the input shaft rotates the rotation shaft to press the one end of the clutch spring so as to loosen the clutch spring whereby the rotation shaft is allowed to rotate with the input shaft,
   when rotation in the other direction is inputted to the input shaft, the input shaft rotates the clutch spring receiver to press the other end of the clutch spring so as to loosen the clutch spring whereby the rotation shaft is allowed to rotate with the input shaft.

2. The blind operating device according to claim 1, wherein the clutch spring receiver includes a plurality of locking grooves, one of which selectively receives said other end of the clutch spring.

3. A blind operating device for respectively transmitting a rotation in both directions from an operation portion to a driving shaft of the blind comprising:
   an input shaft into which rotation from the operation portion is adapted to be inputted;
   a rotation shaft that is arranged coaxially with the input shaft and is capable of transmitting rotation to the driving shaft, said rotation shaft including a rotation spring winding shaft;
   a fixed body, said fixed body including a fixed spring winding shaft which is aligned with the rotation spring winding shaft;
   a clutch spring that is wound around the fixed spring winding shaft of the fixed body and the rotation spring winding shaft of the rotation shaft for allowing switching of linking and de-linking of the rotation shaft and the fixed body by utilizing tightening and loosening of the clutch spring, one end of the clutch spring being connected to the rotation shaft; and
   a clutch spring receiver which is arranged rotatably around a peripheral surface of the fixed spring winding shaft of the fixed body and to which the other end of the clutch spring is connected;
   wherein
   when rotation in one direction is inputted to the input shaft, a part of the clutch spring wound around the fixed spring winding shaft of the fixed body loosens starting from a rotation spring winding shaft side, whereby the rotation shaft is allowed to rotate with the input shaft, and
   when rotation in the other direction is inputted to the input shaft, a part of the clutch spring wound around the fixed spring winding shaft of the fixed body loosens starting from an opposite side to the rotation spring winding shaft, whereby the rotation shaft is allowed to rotate with the input shaft.

4. The blind operating device according to claim 3, wherein when rotation in the one direction is inputted to the input shaft, the rotation is firstly transmitted to a part of the clutch spring wound around the rotation spring winding shaft of the rotation shaft.

5. The blind operating device according to claim 3, wherein the clutch spring receiver includes a plurality of locking grooves, one of which selectively receives said other end of the clutch spring.

6. A blind operating device for transmitting a rotation from an operation portion to a driving shaft of the blind comprising:
   an input shaft into which rotation from the operation portion is adapted to be inputted;
   a rotation shaft that is arranged coaxially with the input shaft and is capable of transmitting rotation to the driving shaft, said rotation shaft including a rotation spring winding shaft of the rotation shaft;
   a fixed body, said fixed body including a fixed spring winding shaft which is aligned with the rotation spring winding shaft;
   a clutch spring that is wound around the fixed spring winding shaft of the fixed body and the rotation spring winding shaft of the rotation shaft for allowing switching of linking and de-linking of the rotation shaft and the fixed body by utilizing tightening and loosening of the clutch spring, one end of the clutch spring being connected to the rotation shaft; and
   a clutch spring receiver which is arranged rotatably around a peripheral surface of the fixed spring winding shaft of the fixed body and to which the other end of the clutch spring is connected;
   wherein
   when rotation is transmitted from the driving shaft to the rotation shaft, a part of the clutch spring wound around the fixed spring winding shaft of the fixed body tightens the fixed spring winding shaft starting from the rotation spring winding shaft side, whereby rotation of the rotation shaft can be prevented.

7. The blind operating device according to claim 6, wherein the clutch spring receiver includes a plurality of locking grooves, one of which selectively receives said other end of the clutch spring.

* * * * *